(12) United States Patent
Aretz et al.

(10) Patent No.: US 12,013,186 B2
(45) Date of Patent: Jun. 18, 2024

(54) SLAG DOOR PUSHER

(71) Applicant: KT-Grant, Inc., Export, PA (US)

(72) Inventors: Timothy Aretz, Ford City, PA (US); Donald Szoszorek, Greensburg, PA (US)

(73) Assignee: KT-GRANT, LLC, Export, PA (US)

( * ) Notice: Subject to any disclaimer, the term of this patent is extended or adjusted under 35 U.S.C. 154(b) by 74 days.

(21) Appl. No.: 17/724,631

(22) Filed: Apr. 20, 2022

(65) Prior Publication Data

US 2023/0341185 A1 Oct. 26, 2023

(51) Int. Cl.
*F27D 3/15* (2006.01)
*B25J 18/02* (2006.01)

(52) U.S. Cl.
CPC .......... *F27D 3/1545* (2013.01); *B25J 18/025* (2013.01)

(58) Field of Classification Search
CPC .... F27D 3/1545; F27D 3/1554; B25J 18/025; B25J 18/04; B25J 18/06; B25J 18/02
USPC .......... 266/135, 228, 271, 227, 44, 273, 272
See application file for complete search history.

(56) References Cited

U.S. PATENT DOCUMENTS

| | | | | |
|---|---|---|---|---|
| 4,037,828 A * | 7/1977 | Terada | ................... | F27D 3/1527 266/271 |
| 4,102,001 A * | 7/1978 | Baba | ..................... | F27B 7/2075 432/75 |
| 5,538,226 A * | 7/1996 | della Foglia | .......... | F27D 25/001 266/271 |
| 5,735,647 A * | 4/1998 | Woodings | ................. | C21B 7/12 173/32 |
| 8,662,291 B2 * | 3/2014 | Henderson | ............. | B65G 21/14 198/588 |

* cited by examiner

*Primary Examiner* — Jessee R Roe
*Assistant Examiner* — Michael Aboagye
(74) *Attorney, Agent, or Firm* — Buchanan Ingersoll & Rooney PC

(57) ABSTRACT

A slag pusher apparatus having a boom with a plurality of telescopingly engaged boom segments. Rollers are positioned between each boom segment to provide support for the boom segments and facilitate extension and retraction of the boom.

19 Claims, 13 Drawing Sheets

SLAG DOOR PUSHER

FIELD OF THE INVENTION

Embodiments relate to a slag door pusher apparatus configured to clean a slag door of a steelmaking electric arc furnace.

BACKGROUND OF THE INVENTION

Iron and steel making operations typically involve the use of slag. While slag is a by-product of smelting ores, it can be intentionally generated and modified to perform various chemical, physical, and mechanical functions to the melt (sometimes referred to as the "heat") that will eventually become the iron or steel. One of the particular uses of slag in iron and steel making operations involving electric furnaces involves its use as a slag dam. Electric furnaces typically utilize a front opening called a slag hole. Slag build-up at the slag hole serves as a dam to prevent the melt from undesirably exiting the furnace. Over time this slag hole requires cleaning, as slag tends to accumulate and solidify at or near the slag hole. The slag is cleaned from the slag hole when a predetermined amount has accumulated (this can be before or after is solidifies).

Slag hole cleaning is typically performed with a slag pusher machine. A slag pusher machine is an apparatus having an arm (or boom) that extends out into the slag hole. A consumable working end (which may include a plate) at the distal end of the arm is used to push scrap into the furnace and scrape the slag from the slag hole by manipulation of the arm (e.g., forward, rearward, up, down, left, right movement). The slag is scraped from the slag hole and caused to fall onto the ground (e.g., into a slag pit) or container adjacent the furnace.

The arms of these slag pusher machines have a telescoping boom arrangement (e.g., inner boom and outer boom that extends and contracts). Known slag pusher machines utilize wear plates (e.g., brass plates) positioned between the inner boom and its adjacent outer boom. These wear plates tend to became worn, leading to excessive clearance between the boom sections. This results in added stress to the actuation cylinders (e.g., pneumatic or hydraulic cylinders) operating the boom, operational control problems causing damage to refractory surrounding the slag door opening, premature failure of the slag pusher machine, and an increase in maintenance time required to keep the machine operational.

The present invention is directed toward overcoming one or more of the above-identified problems, although not necessarily limited to embodiments that do.

SUMMARY OF THE INVENTION

In an exemplary embodiment, a boom for a slag pusher apparatus includes a boom including a plurality of telescopingly engaged boom segments, the plurality of telescopingly engaged boom segments including an outer boom segment and an inner boom segment. The boom includes a roller pair assembly having rollers positioned to act as an interface between the plurality of segments. The roller pair assembly is attached to the outer boom segment such that its rollers protrude through openings formed in the outer boom segment to make contact with the inner boom segment.

In some embodiments, the roller pair assembly is attached to an outer surface of the outer boom segment such that its rollers protrude through the openings to make contact with an outer surface of the inner boom segment.

In some embodiments, a roller of the roller pair assembly is a fixed roller or an adjustable roller.

In some embodiments, the inner boom segment is configured to facilitate removable attachment of a consumable working end member.

In some embodiments, the boom includes the consumable working end member.

In some embodiments, the boom includes an actuator configured to control telescopic translation of the plurality of telescopingly engaged boom segments.

In some embodiments, the actuator is located on a side surface of the boom.

In some embodiments, the boom includes a control module to control actuation of the actuator.

In some embodiments, the boom has a boom mounting end configured to mount the boom to a pivot assembly.

In an exemplary embodiment, a boom for a slag pusher apparatus includes a boom including a plurality of telescopingly engaged boom segments, the plurality of telescopingly engaged boom segments including an outer boom segment, an intermediate boom segment, and an inner boom segment. The boom includes a plurality of roller pair assemblies, each having rollers positioned to act as an interface between the plurality of boom segments, the plurality of roller pair assemblies including an inner roller pair assembly, an intermediate roller pair assembly, and an outer roller pair assembly. The outer roller pair assembly is attached to the outer boom segment such that its rollers protrude through openings formed in the outer boom segment to make contact with the intermediate boom segment. The intermediate roller pair assembly is attached to the intermediate boom segment such that its rollers protrude through openings formed in the intermediate boom segment to make contact with the inner boom segment. The inner roller pair assembly is attached to the inner boom segment such that its rollers make contact with the intermediate boom segment.

In some embodiments, the outer roller pair assembly is attached to an outer surface of the outer boom segment such that its rollers protrude through the outer boom segment openings to make contact with an outer surface of the intermediate boom segment. The intermediate roller pair assembly is attached to the outer surface of the intermediate boom segment such that its rollers protrude through the intermediate boom segment opening to make contact with an outer surface of the inner boom segment. The inner roller pair assembly is attached to the outer surface of inner boom segment such that its rollers make contact with an inner surface of the intermediate boom segment.

In some embodiments, a roller of the plurality of roller pair assemblies is a fixed roller or an adjustable roller.

In some embodiments, the inner boom segment is configured to facilitate removable attachment of a consumable working end member.

In some embodiments, the boom includes the consumable working end member.

In some embodiments, the boom includes an actuator configured to control telescopic translation of the plurality of telescopingly engaged boom segments.

In some embodiments, the actuator is located on a side surface of the boom.

In some embodiments, the boom includes a control module to control actuation of the actuator.

In some embodiments, the boom has a boom mounting end configured to mount the boom to a pivot assembly.

In an exemplary embodiment, a slag door pusher apparatus includes a base. The apparatus includes a pivot assembly connected to the base. The apparatus includes a boom including a plurality of telescopingly engaged boom segments, the plurality of telescopingly engaged boom segments including an outer boom segment, an intermediate boom segment, and an inner boom segment. The boom includes a plurality of roller pair assemblies, each having rollers positioned to act as an interface between the plurality of boom segments, the plurality of roller pair assemblies including an inner roller pair assembly, an intermediate roller pair assembly, and an outer roller pair assembly. The outer roller pair assembly is attached to the outer boom segment such that its rollers protrude through openings formed in the outer boom segment to make contact with the intermediate boom segment. The intermediate roller pair assembly is attached to the intermediate boom segment such that its rollers protrude through openings formed in the intermediate boom segment to make contact with the inner boom segment. The inner roller pair assembly is attached to the inner boom segment such that its rollers make contact with the intermediate boom segment.

In some embodiments, the pivot assembly facilitates pivoting motion of the boom in a vertical direction relative to the base. The pivot assembly includes a turret to facilitate rotational motion of the boom in a horizontal direction relative to the base.

The inventive slag door pusher machine includes a boom rollers acting as an interface between the telescoping segments of the boom. This greatly reduces the maintenance time required to keep the machine operational. In addition, with the inventive design, hydraulic actuators are placed on the sides of the boom as opposed to the top of the boom. This provides greater and more even push/pull force. Moreover, with the inventive design, the boom can made to be a direct replacement for a conventional boom—i.e., the current trunnion and hoist cylinders will accept the new roller boom design.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following Figures, in which.

DETAILED DESCRIPTION OF THE INVENTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Figure 1:
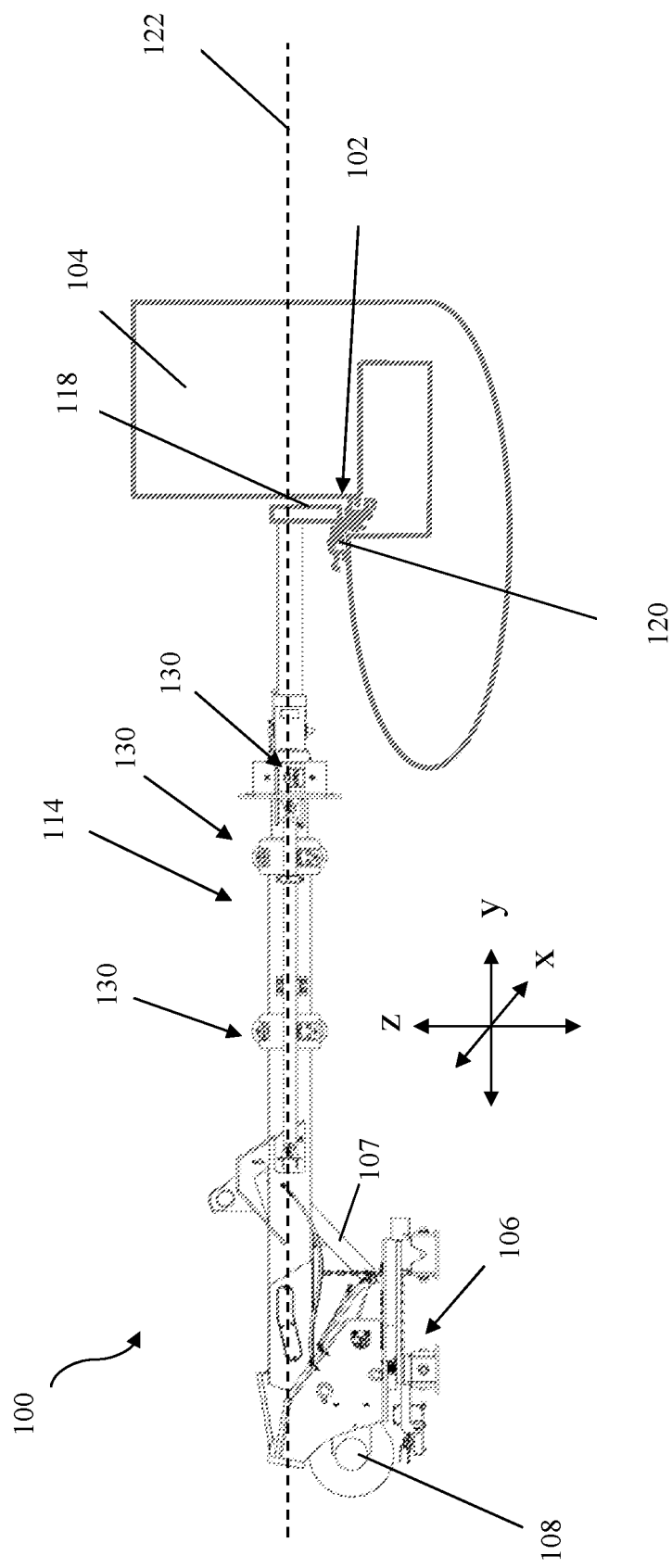
FIG. 1 shows an exemplary embodiment of the slag door pusher apparatus being used to pull slag from a slag hole of a furnace.
Figure 2:
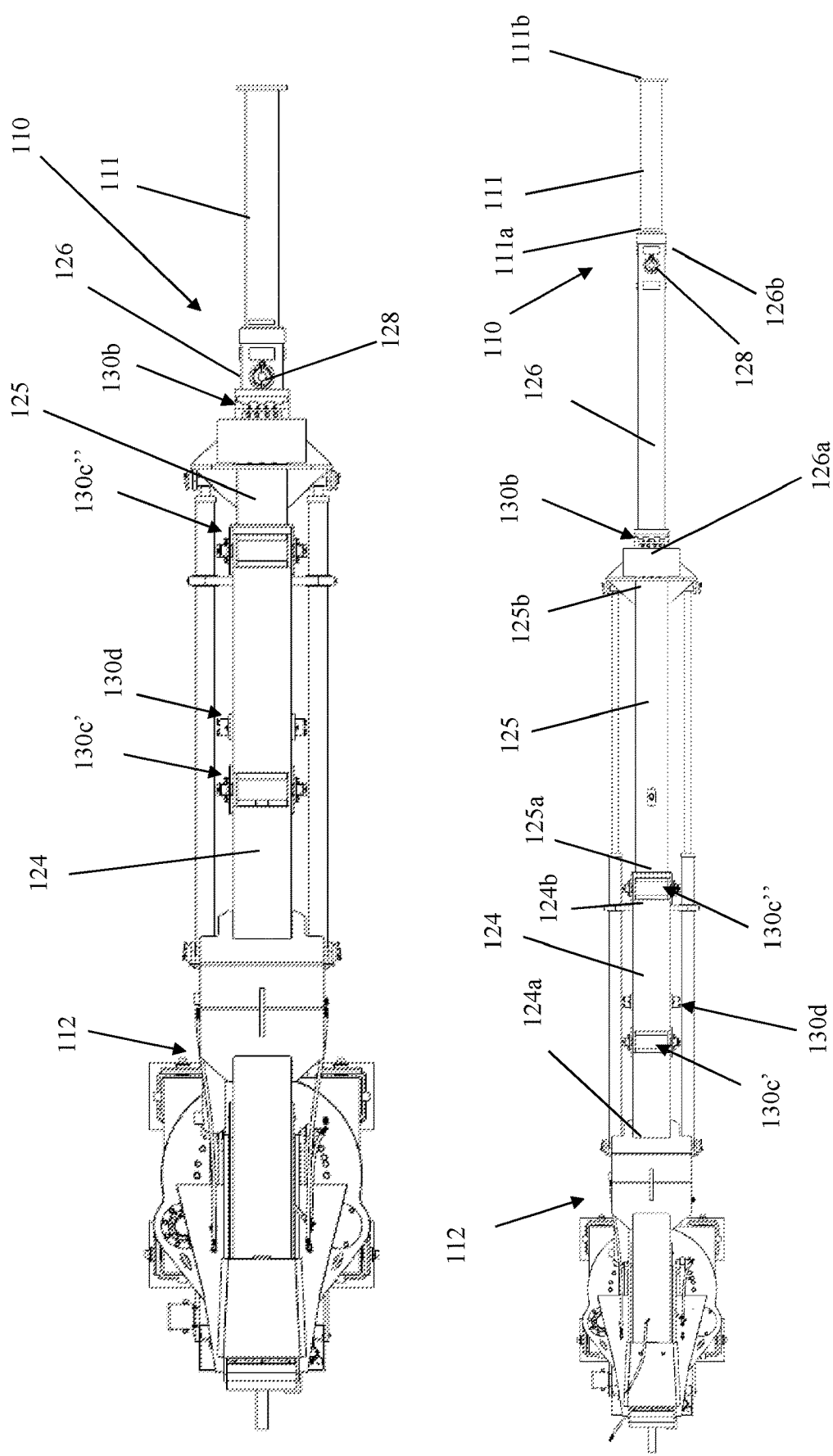
FIG. 2 shows top views of the boom assembly in a retracted position (top drawing) and an extended position (bottom drawing) for an embodiment of the slag door pusher apparatus.

Referring to FIGS. 1-2, embodiments relate to a slag door pusher apparatus 100 configured to clean a slag hole 102 of a steelmaking furnace 104. The slag door pusher apparatus 100 includes a base 106. For instance, the base 106 can include a pivot assembly 108 (e.g., trunnion) configured to facilitate mounting the slag door pusher apparatus 100 in a pivoting manner. As an example, the slag door pusher apparatus 100 includes a boom 114 having a boom working end 110 and a boom mounting end 112. The boom working end 110 is configured to facilitate connection of a consumable working end member 111. The consumable working end member 111 is used to push scrap into the furnace 104 and scrape slag from the furnace 104. The boom mounting end 112 is the end used to mount the boom 114 to the base 106. Thus, the boom mounting end 112 can be pivotally connected (via a hinge, a pin-and-hole, bearing, race, etc.) to the pivot assembly 108 of the base 106. The pivot assembly 108 mounts the boom 114 to the base 106 but allows the boom 114 to pivot in the vertical direction (in the z-direction shown in FIG. 1). The vertical movement of the pivot assembly 108 is achieved via an actuator 107 (e.g., a hydraulic piston actuator 107). In some embodiments, pivot assembly 108 rotates (e.g., the pivot assembly is also configured as a turret), allowing for rotation of the boom 114 in the horizontal direction (in the x-direction shown in FIG. 1). The pivot assembly 108 can be operated via actuators (e.g., electric, pneumatic, hydraulic, etc.) to cause the boom 114 to pivot and/or rotate. As will be explained later, the boom 114 has boom actuators 116 (e.g., electric, pneumatic, hydraulic, etc.) to causes the boom 114 to extend and retract (e.g., along the y-direction shown in FIG. 1).

The boom 114 has a boom working end 110 and a boom mounting end 112. The consumable working end member 111 is removably attachable to the boom working end 110. The boom mounting end 112 is configured to pivotally attach to the pivot assembly 108. This pivot connection can be via a hinge mechanism, a pin-and-hole mechanism, a bearing mechanism, a race mechanism, etc. The consumable working end member 111 can have a tool 118 (e.g., a plate, blade, edge, etc.) used to scrape slag 120. This tool 118 can be permanently or removably attached to the consumable working end member 111.

The boom 114 has a longitudinal axis 122 extending from the boom mounting end 112 to the boom working end 110. When the consumable working end member 111 is attached to the boom working end 110, it is attached in a cantilever manner. Thus, when the consumable working end member 111 is attached to the boom working end 110 the longitudinal axis 122 extends from the boom mounting end 112 to the consumable working end member 111. The boom 114 is extendable and retractable along the longitudinal axis 122. This is accomplished via a telescoping arrangement—e.g., the boom 114 includes a plurality of boom segments that are telescoping engaged with each other. For instance, the boom 114 can have a first boom segment and a second boom segment, wherein the first and second segments telescopingly engage each other. The first segment forms the boom mounting end 112 and the second segment is configured to facilitate attachment of the consumable working end 110 to a distal end of the second segment. More or less boom segments can be used to meet a desired design criterion—e.g., there can be two boom segments, three boom segments, four boom segments, etc.

Figure 3:
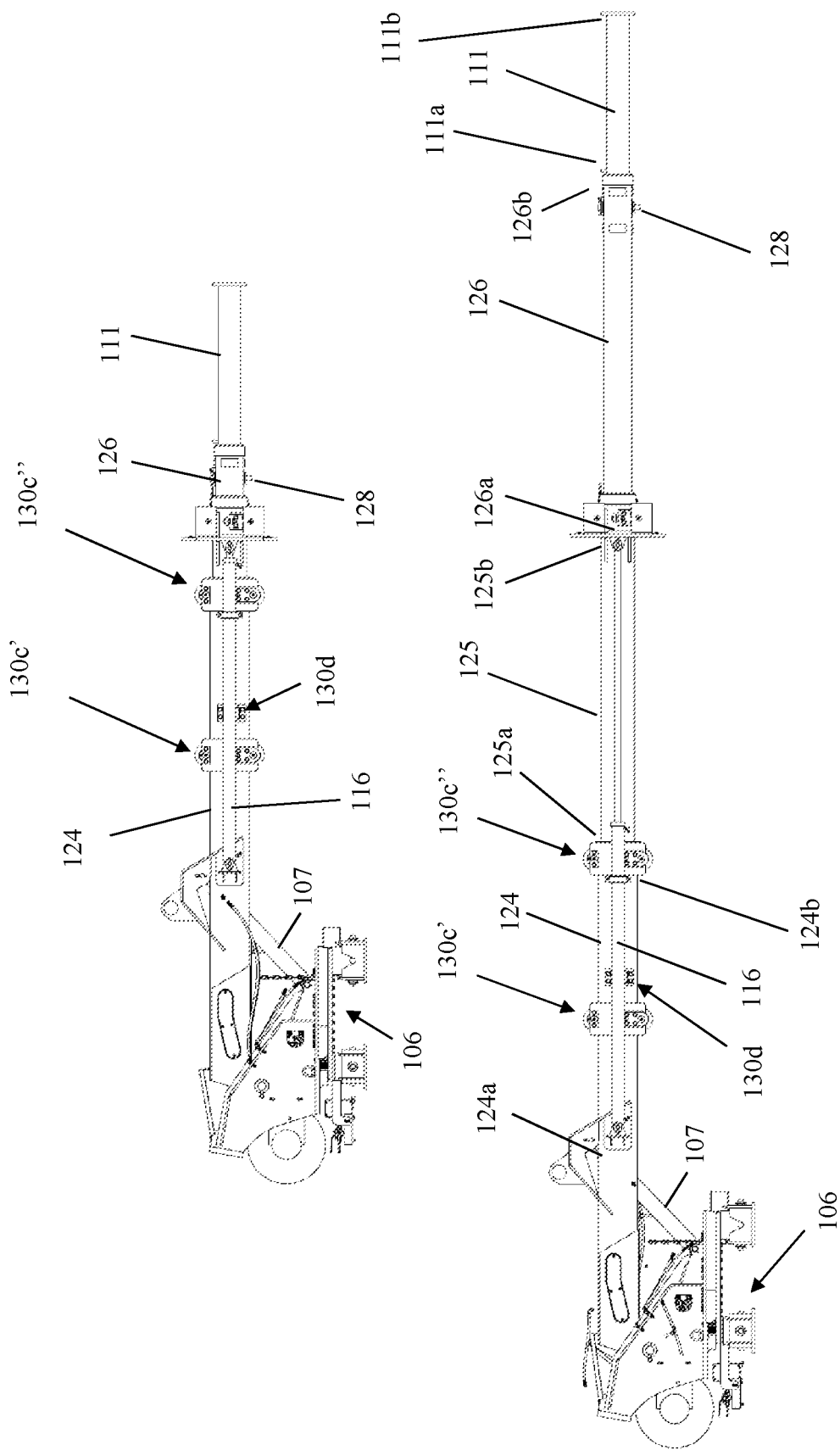
FIG. 3 shows side views of the boom assembly in a retracted position (top drawing) and an extended position (bottom drawing) for an embodiment of the slag door pusher apparatus.
Figure 4:
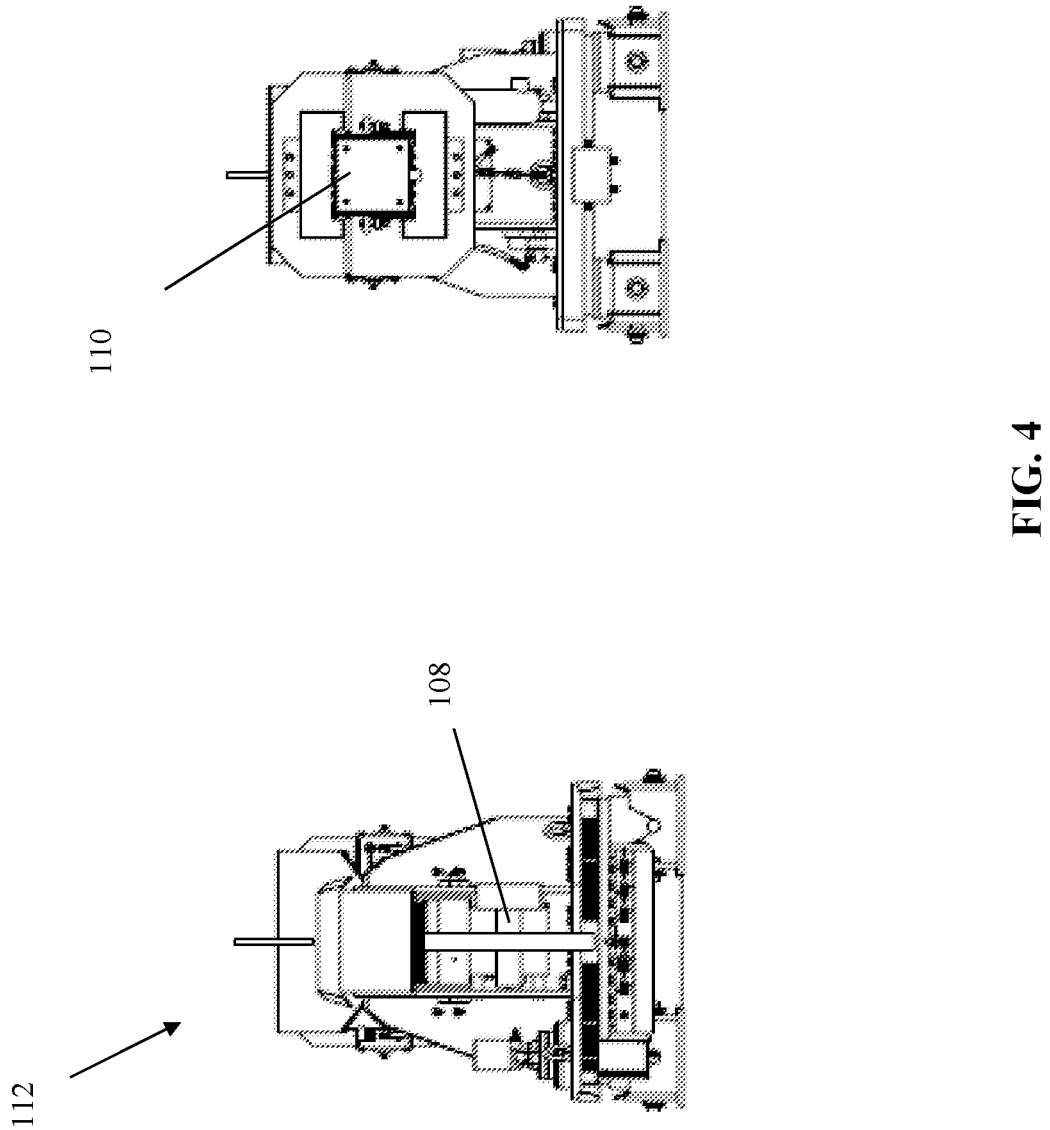
FIG. 4 shows a rear (or proximal end) view (left drawing) and front (or distal end) view (right drawing) of the boom assembly for an embodiment of the slag door pusher apparatus.
Figure 5:
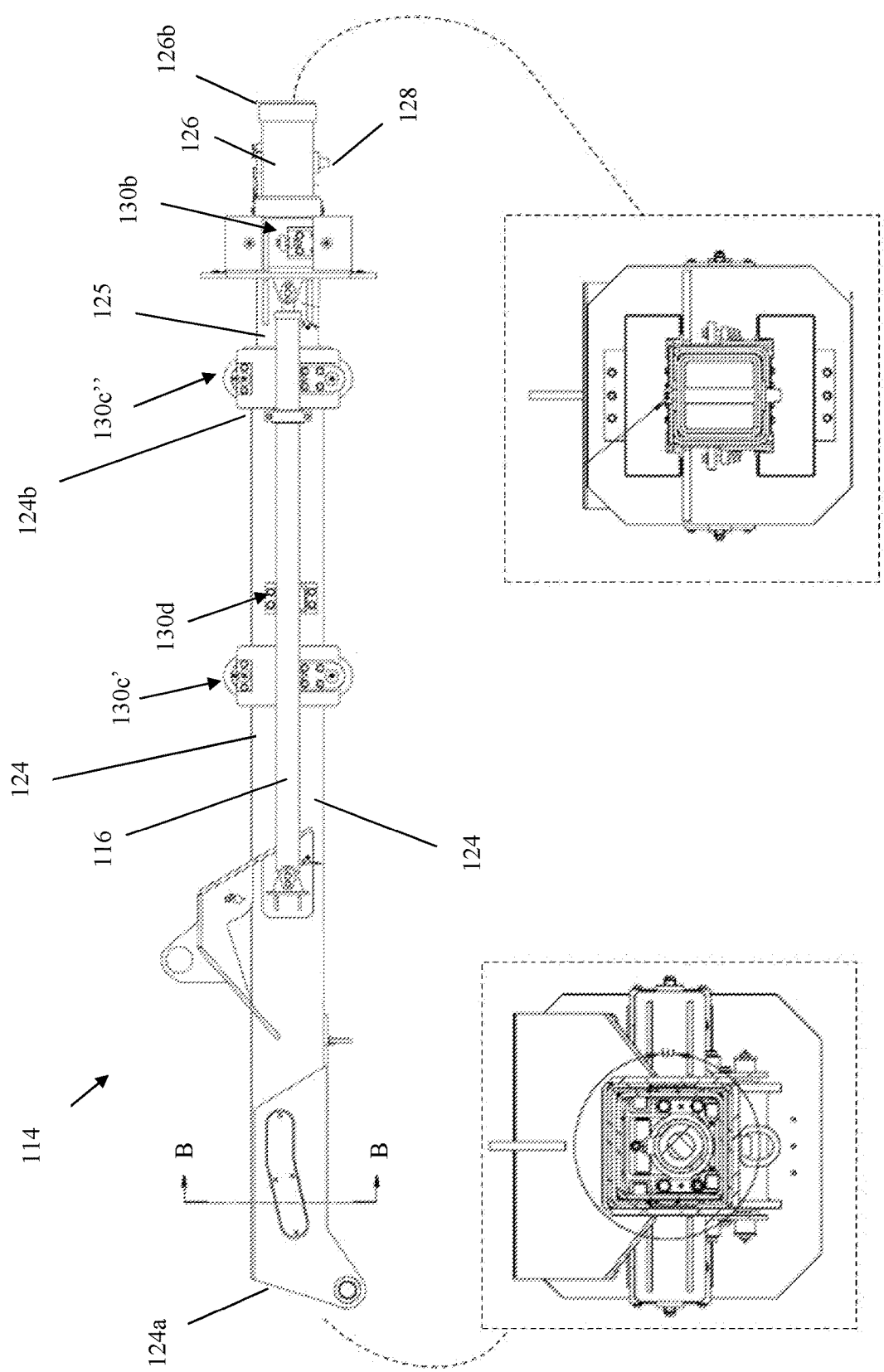
FIG. 5 shows side (top drawing), rear (bottom-left drawing), and front (bottom-right drawing) views of an embodiment of the boom in a retracted position.
Figure 6:
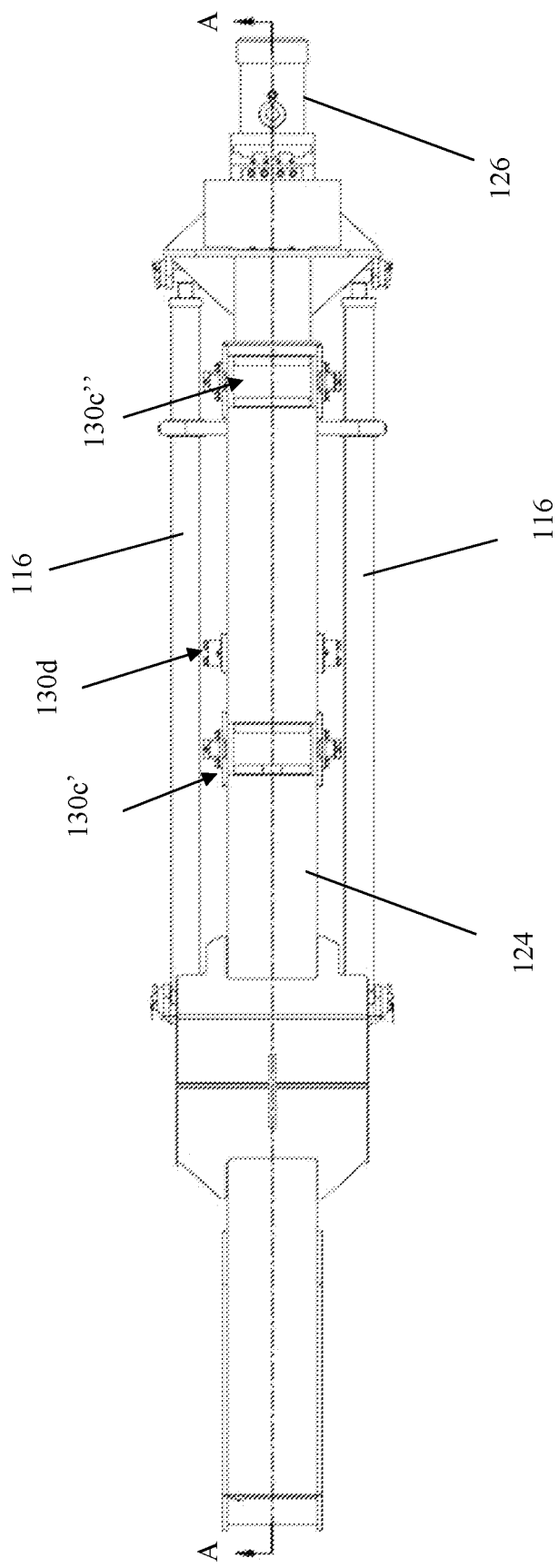
FIG. 6 shows a top view of an embodiment of the boom in a retracted position.

Referring to FIGS. 2-9, as a non-limiting example, the boom 114 has an outer boom segment 124, an intermediate boom segment 125, and an inner boom segment 126. FIGS. 1-3 show the slag door pusher apparatus 100 with the consumable working end member 111 attached to the boom working end 110. FIGS. 5-9 show the slag door pusher apparatus 100 without the consumable working end member 111. The outer boom segment 124 has an outer boom segment proximal end 124a (forming the boom mounting end 112) and an outer boom segment distal end 124b. The outer boom segment 124 is a hollow structure, and thus has an outer boom segment inner surface 124c and an outer boom segment outer surface 124d. The outer boom segment 124 can have a square cross-sectional shape. The outer boom segment distal end 124b is open to facilitate slidable movement of the intermediate boom segment 125 in and out of the interior of the outer boom segment 124. In this regard, the inner diameter of the outer boom segment 124 is greater than the outer diameter of the intermediate boom segment 125.

The intermediate boom segment 125 has an intermediate boom segment proximal end 125a and an intermediate boom segment distal end 125b. The intermediate boom segment 125 is a hollow structure, and thus has an intermediate boom segment inner surface 125c and an intermediate boom segment outer surface 125d. The intermediate boom segment 125 can have a square cross-sectional shape. The intermediate boom segment distal end 125b is open to facilitate slidable movement of the inner boom segment 126 in and out of the interior of the intermediate boom segment 125. In this regard, the inner diameter of the intermediate boom segments 125 is greater than the outer diameter of the inner boom segment 126. As will be explained herein, the inner boom segment 126 is configured to facilitate attachment of the consumable working end 110 to a distal end of the inner boom segment 126.

The inner boom segment 126 has an inner boom segment proximal end 126a and an inner boom segment distal end 126b (the distal end 126b forming the boom working end 110). The inner boom segment 126 can be a hollow structure or a solid structure. The inner boom segment 126 can have a square cross-sectional shape. The inner boom segment distal end 126b is open to facilitate insertion of the consumable working end member 111 so that is partially inserts within the inner boom segment 126. In this regard, the inner diameter of the inner boom segment 126, at least at the inner boom segment distal end 126b, is greater than the outer diameter of the consumable working end member 111. The inner boom segment distal end 126b can have an aperture that coincides with an aperture formed in the consumable working end member 111. After the consumable working end member 111 is inserted into the inner boom segment distal end 126b, a pin 128 is inserted through the coinciding apertures to attach the consumable working end member 111 to the inner boom segment 126—e.g., the consumable working end member 111 can be attached to the inner boom segment 126 so as to extend therefrom in a cantilever manner.

The consumable working end member 111 has a consumable working end member proximal end 111a and a consumable working end member distal end 111b. The consumable working end member 111 is a solid structure. The consumable working end member 111 can have a square cross-sectional shape. The consumable working end member distal end 111b, when the consumable working end member 111 is attached to the boom 114, spearheads insertion into the furnace 104 and may include the tool 118 to assist with scraping slag 120 and/or manipulating scrap. The consumable working end member proximal end 111a includes the aperture to facilitate attachment to the inner boom segment distal end 126b. The consumable working end member 111, or any portion thereof, can be sacrificial. In addition, the tool 118 can also be sacrificial. Thus, while the slag door pusher apparatus 100 is used to clean the slag hole 102, the plate 118 and/or portions of the consumable working end member 111 can be consumed by being heated and melted due to the heat from the furnace 104 and coming into contact with the melt.

In a fully retracted state, the inner boom segment 126 is slid within the intermediate boom segment 125, and the intermediate boom segment 125 is slid within the outer boom segment 124. The consumable working end member 111 does not retract within the inner boom segment 126, but is rather held stationary relative to the inner boom segment 126. Depending on the lengths of the segments 124, 125, 126 and whether mechanical stops are used, the consumable working end member 111 (or any portion thereof) may or may not be positioned within the intermediate boom segment 125 and/or the outer boom segment 124 when the boom is fully retracted. In a fully extended state, inner boom segment 126 is extended from the interior of the intermediate boom segment 125, and the intermediate boom segment 125 is extended from the interior of the outer boom segment 124. Again, the consumable working end member 111 is affixed to the inner boom segment 126 in a stationary manner so it too extends along with the inner boom segment 126.

The boom 114 can include mechanical stops, encoders, etc. to prevent over extension (extending a boom segment so that it separates from the boom segment it is telescopingly engaged with) or over retraction (retracting a boom segment so that it causes damage to the boom segment or to an actuator controlling the retraction).

The description of a three-segment boom 114 and relative movements between the segments discussed and illustrated is exemplary. The boom 114 can have any number of segments and the relative movements are not limited to the exemplary configuration discussed above. For instance, with the three-segment boom, it may be desired to have the intermediate boom segment 125 be stationary relative to the outer boom segment 125. Thus, the telescoping movement can be limited to relative movement between the intermediate boom segment 125 and the inner boom segment 126. Similarly, it may be desired to have the inner boom segment 126 be stationary relative to the intermediate boom segment 125. Thus, the telescoping movement can be limited to relative movement between the intermediate boom segment 125 and the outer boom segment 124. In addition, it may be desired to have a two-segment boom 114. For instance, the boom 114 can have an outer boom segment 124 and an inner boom segment 126. In this embodiment, the outer boom segment distal end 124b is open to facilitate slidable movement of the inner boom segment 126 in and out of the interior of the outer boom segment 124. In this regard, the inner diameter of the outer boom segment 124 is greater than the outer diameter of the inner boom segment 126.

The boom 114 has actuators 116 to cause the boom segments to move relative to each other. The actuators 116 can be electrical, pneumatic, or hydraulic actuators. There can be an actuator 116 to cause relative movement between any two boom segments. Actuation of the actuator(s) 116 allows the boom 114 to be extended and retracted within a range between a fully extended state and a fully retracted state, thereby facilitating slag removal and scrap manipulation operations. For instance, the boom's length can be controlled so that the inner boom segment 126 (and thus the consumable working end member 111) is reciprocated back and forth along the longitudinal axis 122 (e.g., the boom segments are telescopingly translated) so as to allow for scraping slag 120 from the slag hole 102 via the consumable working end 110.

In the exemplary embodiment shown, the boom 114 has three segments (inner boom segment 126, intermediate boom segment 125, and outer boom segment 124) and includes an actuator 116 to cause relative movement between the inner boom segment 126 and the rest of the boom 114 (this can be relative movement between the inner boom segment 126 and the intermediate boom segment 125 and/or the outer boom segment 124). For instance, the actuator 116 can be a hydraulic piston actuator 116 connected to the intermediate boom segment 125 and the inner boom segment 126. Actuation of the actuator 116 forces the inner boom segment 126 to move relative to the intermediate boom segment 125. Because the consumable working end member 111 is affixed to the inner boom segment 126, this movement will also cause the consumable working end 110 to move relative to the intermediate boom segment 125 unless the boom 114 is fully retracted/extended. This movement will continue until actuation of the actuator 116 ceases or until the boom 114 is fully extended/retracted.

Other configurations can be used. For instance, the actuator 116 can be connected to the outer boom segment 124 and the intermediate boom segment 125 (actuation thereof causing relative movement between the outer boom segment 124 and the intermediate boom segment 125). As another example, the actuator 116 can be connected to the outer boom segment 124 and the inner boom segment 126 (actuation thereof causing relative movement between the outer boom segment 124 and the inner boom segment 126). With the actuator 116 connected to the outer boom segment 124 and the inner boom segment 126, movement towards the extended position will cause the inner boom segment 126 to extend out from the intermediate boom segment 125 until full extension occurs between segments 125, 126 and then both segments 125, 126 move relative to the outer boom segment 124 until full extension of the boom 114 is achieved. Similarly, movement towards the retracted position will cause the inner boom segment 126 to retract into the intermediate boom segment 125 until full retract occurs between segments 125, 126 and then both segments 125, 126 move relative to the outer boom segment 124 until full retraction of the boom 114 occurs.

Any number of actuators 116 and connection arrangements to boom segments can be used. For instance, there can be an actuator 116 connected between the outer boom segment 124 and the intermediate boom segment 125 and another actuator 116 connection between the intermediate boom segment 125 and the inner boom segment 126.

With the exemplary embodiment illustrated in the Figures, there is a hydraulic piston actuator 116 connected to the intermediate boom segment outer surface 125d. The hydraulic piston actuator 116 is also connected to the inner boom segment outer surface 126d. There can be more than one hydraulic piston actuator 116. For instance, there can be a first hydraulic piston actuator 116 on one side of the boom 114 and a second hydraulic piston actuator 116 on the other side of the boom 114. While the actuator(s) 116 can be attached to a top, bottom, or side surfaces of the boom 114, it is contemplated for the actuator(s) 116 to be attached to a side surface.

Actuation of the pivot assembly 108 and any of the actuators 107, 116 disclosed herein can be via a control module. The control module can be in wired or wireless communication with any of the actuators of the slag door pusher apparatus 100. The control module can be a processor with associated memory. Any of the actuators 116 disclosed herein an also have a processor and associated memory. Any of the processors can have transceivers or other communication devices/circuitry to facilitate transmission and reception of wireless signals. Any of the processors can include an Application Programming Interface (API) as a software intermediary that allows two applications to talk to each other. Use of an API can allow software of the control module to communicate with software of the actuator(s) 116. Any of the memory disclosed herein can be transitory, non-transitory, volatile, non-volatile, etc. memory.

Referring to FIGS. 1-13, the boom 114 includes at least one roller pair assembly 130. The roller pair assembly 130 includes two rollers 131 housed within a bracket 138 (see FIG. 11). The roller pair assembly 130 is attached to the boom 114. Any one or combination of the rollers 131 of the pair assembly 130 can be a cylindrical roller bar within a bearing assembly, a wheelie roller bar, etc. The roller pair assembly 130 is positioned so that the rollers 131 support two telescopingly engaged boom segments and allows them to be telescopingly translated by one or both segments rolling over rollers 131. Each roller 131 is positioned to span widths (or at least partially span the widths) of the boom segments for which it provides an interface. Each boom segment has a top-facing surface 132 and a bottom-facing surface 134. At least one of the roller pair assemblies 130 can be placed between the boom segments such that the rollers 131 are positioned on the top-facing or bottom-facing surfaces 132, 134. Any number of roller pair assemblies 130 can be used to meet a desired design criterion. In addition, while it is contemplated for the roller pair assemblies 130 to be placed such that the rollers 131 are positioned on the top-facing and bottom-facing surfaces 132, 134, any number of combination of the roller pair assemblies 130 can be placed such that the rollers 131 are positioned on the side surfaces of the boom segments.

Figure 7:
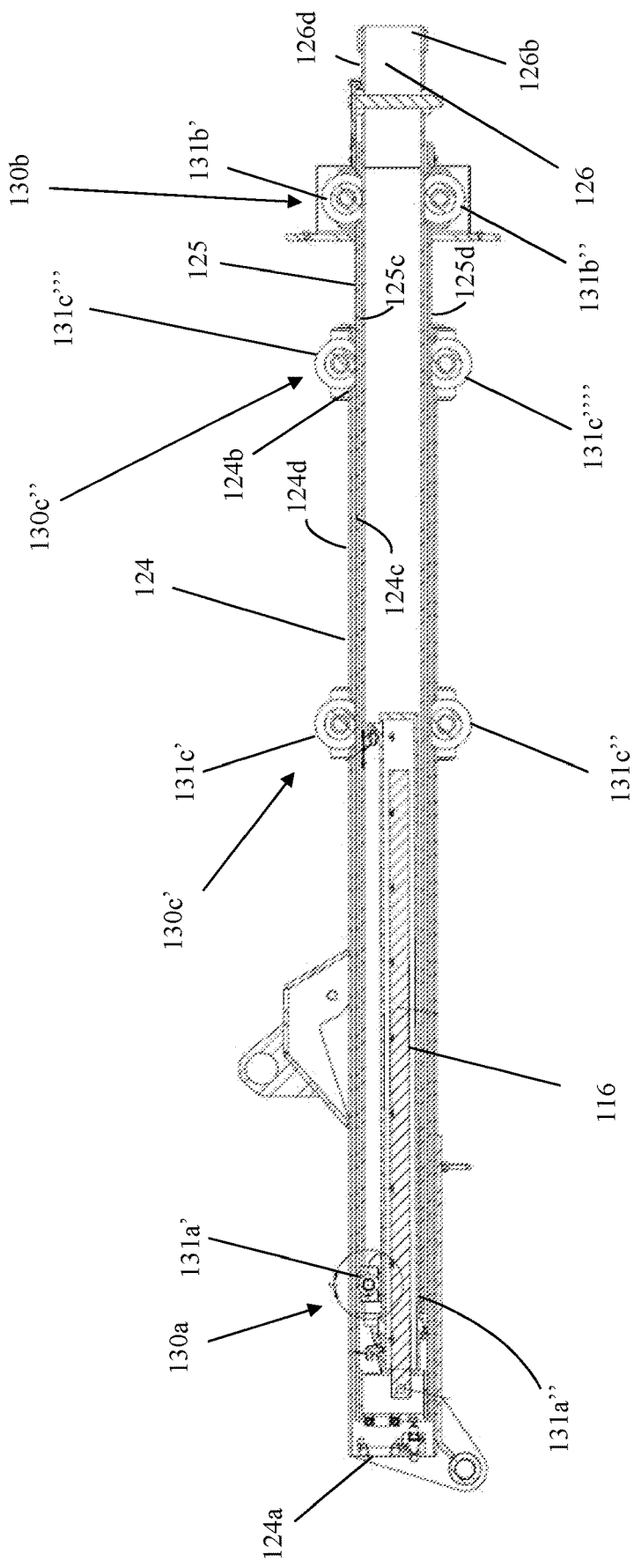
FIG. 7 shows a cross-sectional view along the A-A line (see FIG. 6) of an embodiment of the boom in a retracted position.
Figure 8:
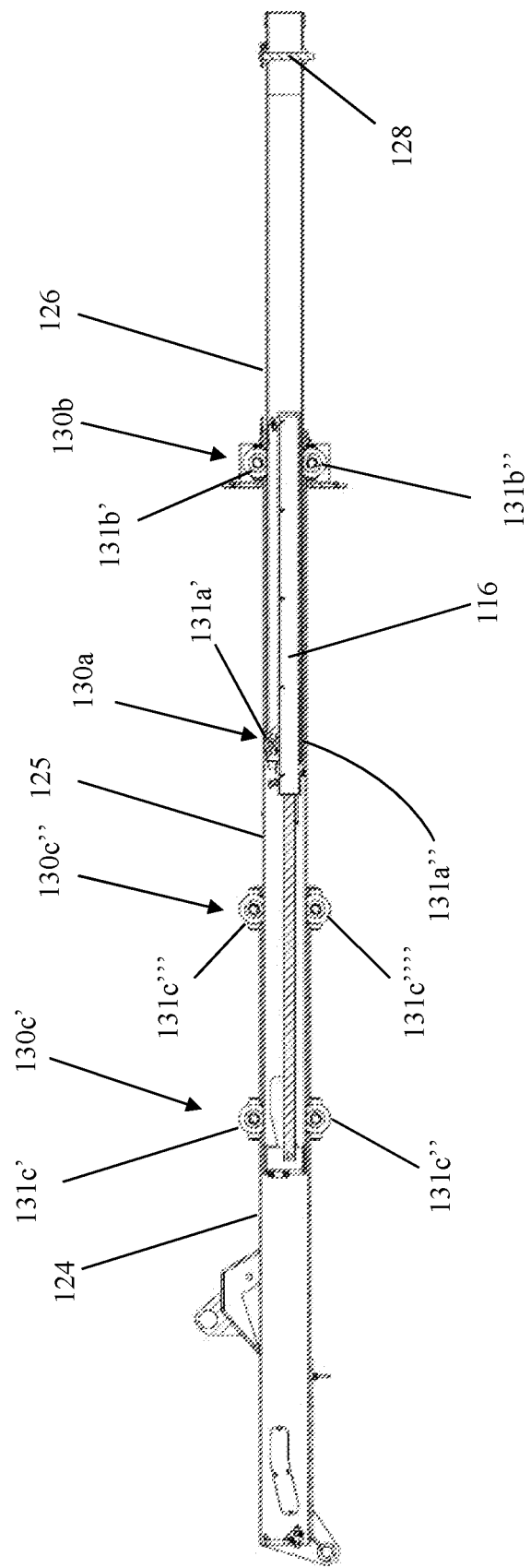
FIG. 8 shows a cross-sectional view along the A-A line (see FIG. 6) of an embodiment of the boom in an extended position.

Referring to FIGS. 7 and 8, a non-limited exemplary embodiment of roller pair assembly 130 arrangements for a three-segment boom 114 is described below.

The boom 114 has at least one inner roller pair assembly 130a. The inner roller pair assembly 130a is attached to the inner boom segment 126 so that its rollers 131a ride along and support the intermediate boom segment 125 when the inner boom segment 126 is telescopingly translated relative to the intermediate boom segment 125. Note that only one roller 131a of the inner roller pair assembly 130a is shown in FIGS. 7 and 8. The boom 114 has at least one intermediate roller pair assembly 130b. The intermediate roller pair assembly 130b is attached to the intermediate boom segment 125 so that its rollers 131b ride along and support the inner boom segment 126 when the inner boom segment 126 is telescopingly translated relative to the intermediate boom segment 125. The boom 114 has at least one outer roller pair assembly 130c. The outer roller pair assembly 103c is attached to the outer boom segment 124 so that its rollers 131c ride along and support the intermediate boom segment 125 when the outer boom segment 124 and intermediate boom segment 125 are telescopingly translated.

In the exemplary embodiment of FIGS. 7 and 8, the boom 114 has an inner roller pair assembly 130a with a first inner roller 131a' and a second inner roller 131a" (this roller 131a" is hidden behind the boom actuator 116). The inner roller pair assembly 130a is attached to an outer surface of the inner boom segment 126 such that its first inner roller 131a' is positioned on the top-facing surface 132 of the inner boom segment 126 and its second inner roller 131a" is attached to the bottom-facing surface 134 of the inner boom segment 126. While the inner roller pair assembly 130a can be located at any location of the inner boom segment 126, it is contemplated for it to be located at or near the inner boom segment proximal end 126a. The inner roller pair assembly 130a is attached to the inner boom segment 126 so that the first and second inner rollers 131a', 131a" make contact with, ride along, and support the intermediate boom segment 125 when the inner boom segment 126 and intermediate boom segment 125 are telescopingly translated.

Figure 12:
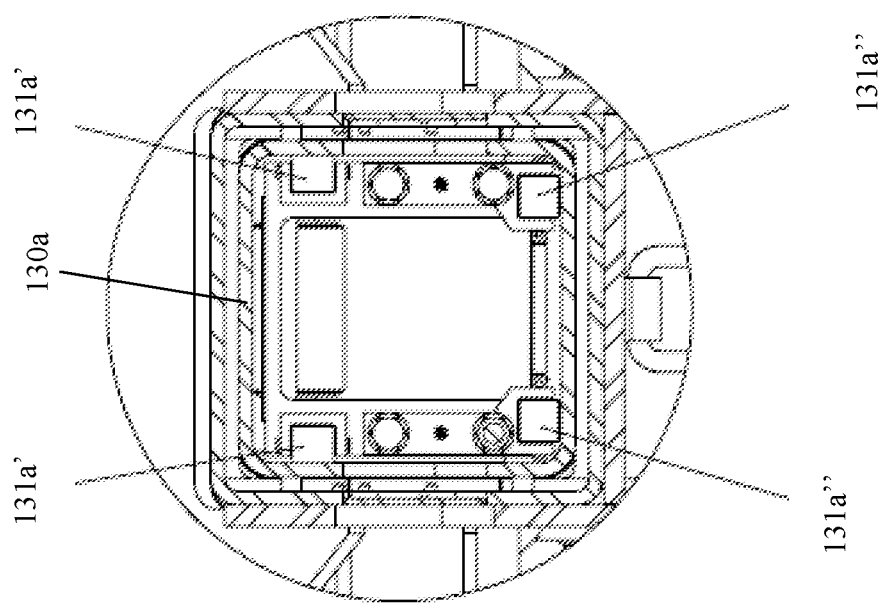
FIG. 12 shows an embodiment of the boom with inner boom guide rollers and inner boom wheelie bar rollers.

FIG. 12 shows a cross-sectional view looking down the longitudinal axes 122 in which the first inner roller 131a' is a guide roller style roller and the second (lower) inner roller 131a" is a wheelie bar style roller. Typically, the rollers will be constructed of the same material and be the same size, although differences in size and material are contemplated. As will be explained herein, some rollers can be fixed and some can be adjustable. As shown in FIG. 12, the first (guide) inner roller 131a' is in a fixed position, and the second (wheelie bar) roller 131a" is adjustable.

The boom 114 has one intermediate roller pair assembly 130b with a first intermediate roller 131b' and a second intermediate roller 131b". The intermediate roller pair 130b is attached to an outer surface of the intermediate boom segment 125 such that its first intermediate roller 131b' protrudes through an opening formed in the intermediate boom segment 125 so as to make contact with a top-facing, outer surface of the inner boom segment 126, and its second intermediate roller 131b" protrudes through an opening formed in the intermediate boom segment 125 so as to make contact with a bottom-facing, outer surface of the inner boom segment 126. While the intermediate roller pair 130b can be located at any location of the intermediate boom segment 125, it is contemplated for it to be located at or near the intermediate boom segment distal end 125b. The intermediate roller pair 130b is attached to the intermediate boom segment 125 so that the first and second intermediate rollers 131b', 131b" make contact with, ride along, and support the inner boom segment 126 when the inner boom segment 126 and intermediate boom segment 125 are telescopingly translated.

The boom 114 has two outer roller pair assemblies: a first outer roller pair assembly 130c' and a second outer roller pair assembly 130c". The first outer roller pair assembly 130c' has a first outer roller 131c' and a second outer roller 131c". The second outer roller pair assembly 130c' has a first outer roller 131c" and a second outer roller 131c".

The first outer roller pair assembly 130c' is attached to an outer surface of the outer boom segment 124 such that its first outer roller 131c' protrudes through an opening formed in the outer boom segment 124 so as to make contact with a top-facing, outer surface of the intermediate boom segment 125, and its second outer roller 131c" protrudes through an opening formed in the outer boom segment 124 so as to make contact with a bottom-facing, outer surface of the intermediate boom segment 125.

The second outer roller pair assembly 130c" is attached to an outer surface of the outer boom segment 124 such that its first outer roller 131c" protrudes through an opening formed in the outer boom segment 124 so as to make contact with a top-facing, outer surface of the intermediate boom segment 125, and its second outer roller 131c" protrudes through an opening formed in the outer boom segment 124 so as to make contact with a bottom-facing, outer surface of the intermediate boom segment 125.

The first outer roller pair assembly 130c' and the second outer roller pair assembly 130c" can be adjacent or in close proximity to each other. While the first outer roller pair assembly 130c' and the second outer roller pair assembly 130c" can be located at any location of the outer boom segment 124, it is contemplated for them to be located at an intermediate location (between the outer boom segment proximal end 124a and the outer boom segment distal end 124b) of the outer boom segment 124. The first outer roller pair assembly 130c' and the second outer roller pair assembly 130c" are attached to the outer boom segment 124 so that their rollers 131c', 131c", 131c''', 131c"" make contact with, ride along, and support the intermediate boom segment 125 when the outer boom segment 124 and intermediate boom segment 125 are telescopingly translated.

Figure 9:
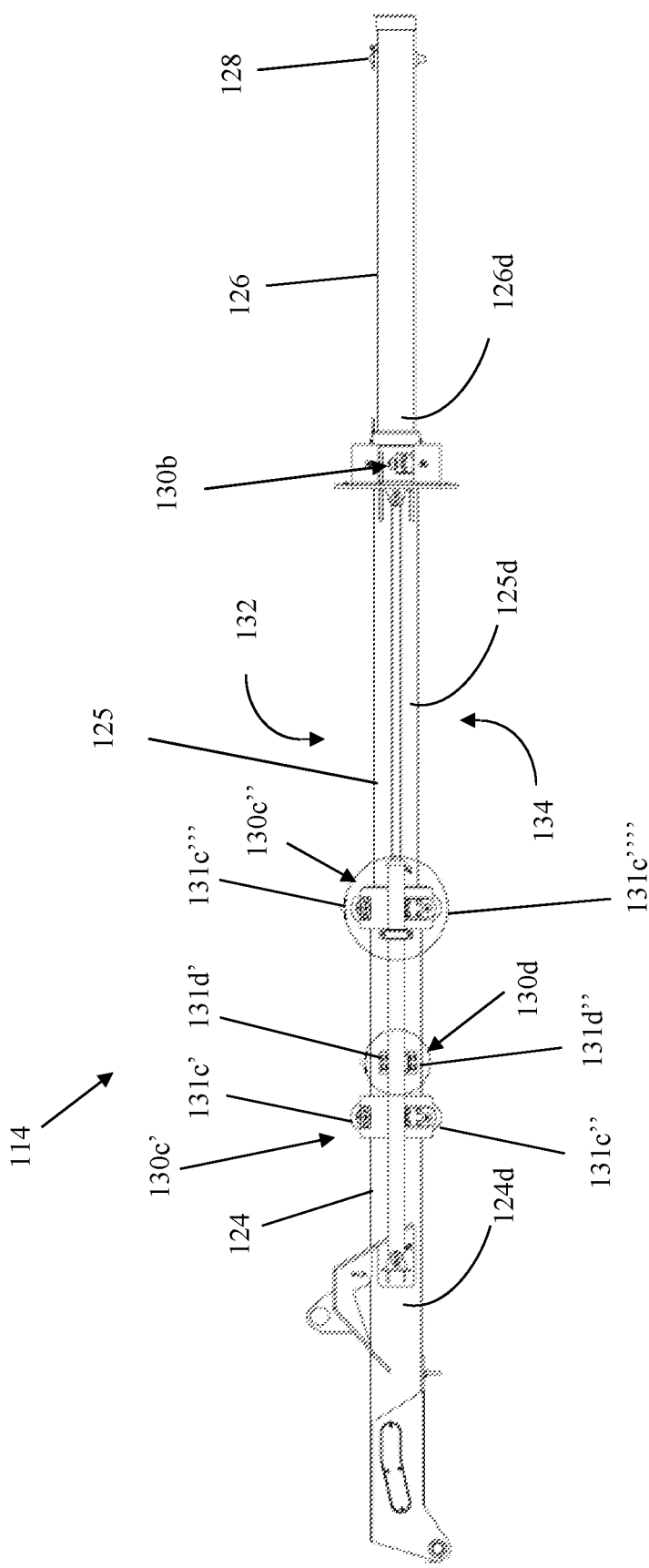
FIG. 9 shows a side view of an embodiment of the boom in an extended position.

Exemplary embodiments show roller pair assemblies 130 placed such that their rollers 131 are attached to the top-facing and/or bottom-facing surfaces 132, 134 of the boom segments 124, 125, 126. However, it is understood that any one or combination of the roller pair assemblies 130 can be placed such that its rollers 131 are attached to a side surface of any one or combination of the boom segments 124, 125, 126. FIG. 9 shows an exemplary embodiment in which there is a side outer roller pair assembly 130d attached to an outer, side surface of the outer boom segment 124 such that its first outer roller 131d' protrudes through an opening formed in the outer boom segment 124 so as to make contact with a side-facing, outer surface of the intermediate boom segment 125, and its second outer roller 131d'" protrudes through an opening formed in the outer boom segment 124 so as to make contact with an opposing side-facing, outer surface of the intermediate boom segment 125. The side outer roller pair assembly 130d is attached to the outer boom segment 124 so that its rollers 131d', 131d" make contact with, ride along, and support the intermediate boom segment 125 when the outer boom segment 124 and intermediate boom segment 125 are telescopingly translated.

As noted above, the apparatus 100 may be configured to have a two-segment boom 114. This embodiment has an outer boom segment 124 and an inner boom segment 126, wherein the inner boom segment 126 is telescopingly translated relative to the outer boom segment 124 via the actuator(s) 116. The number and placement of roller pair assemblies 130 can be adjusted to accommodate the number of segments. For instance, it may be desirable or beneficial to use more roller pair assemblies 130 as the number of boom segments used increases. With a two-segment boom 114 configuration, it may only be necessary to use two outer roller pair assemblies 130c', 130c" (i.e., there may be no need for intermediate or inner roller pair assemblies). The first and second outer roller pair assemblies 130c', 130c" can be placed on the outer boom segment 124 and configured as discussed above for the three-segment boom configuration, but their rollers 131c', 131c", 131c''', 131c'''' will protrude through an opening formed in the outer boom segment 124 so as to make contact with the inner boom segment 126 as opposed to making contact with an intermediate boom segment 125—i.e., the rollers 131c', 131c", 131c''', 131c'''' make contact with, ride along, and support the inner boom segment 126 when the outer boom segment 124 and inner boom segment 126 are telescopingly translated.

Figure 10:
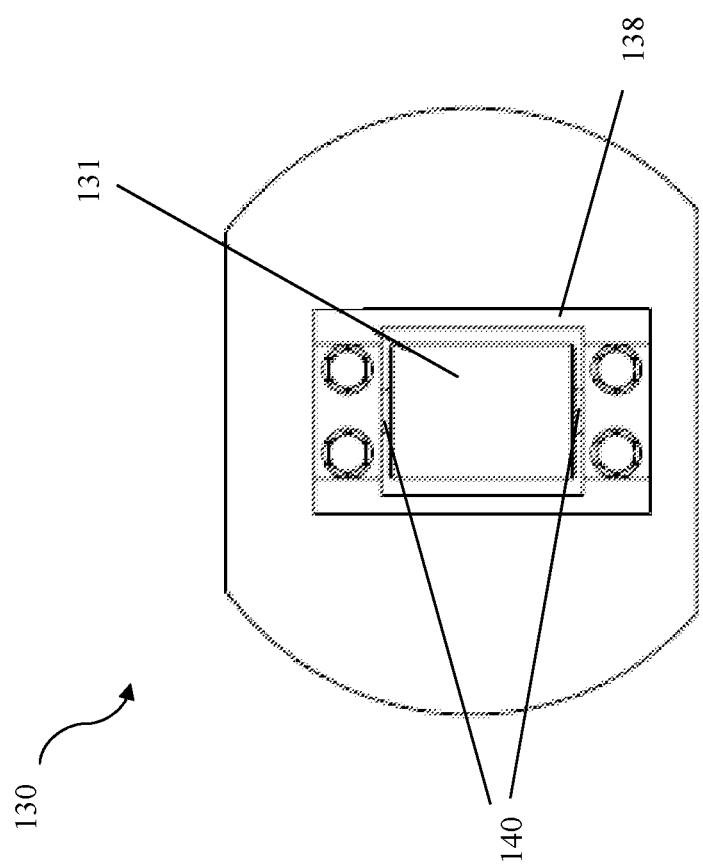
FIG. 10 is a top view of a roller pair assembly, showing a fixed roller.
Figure 11:
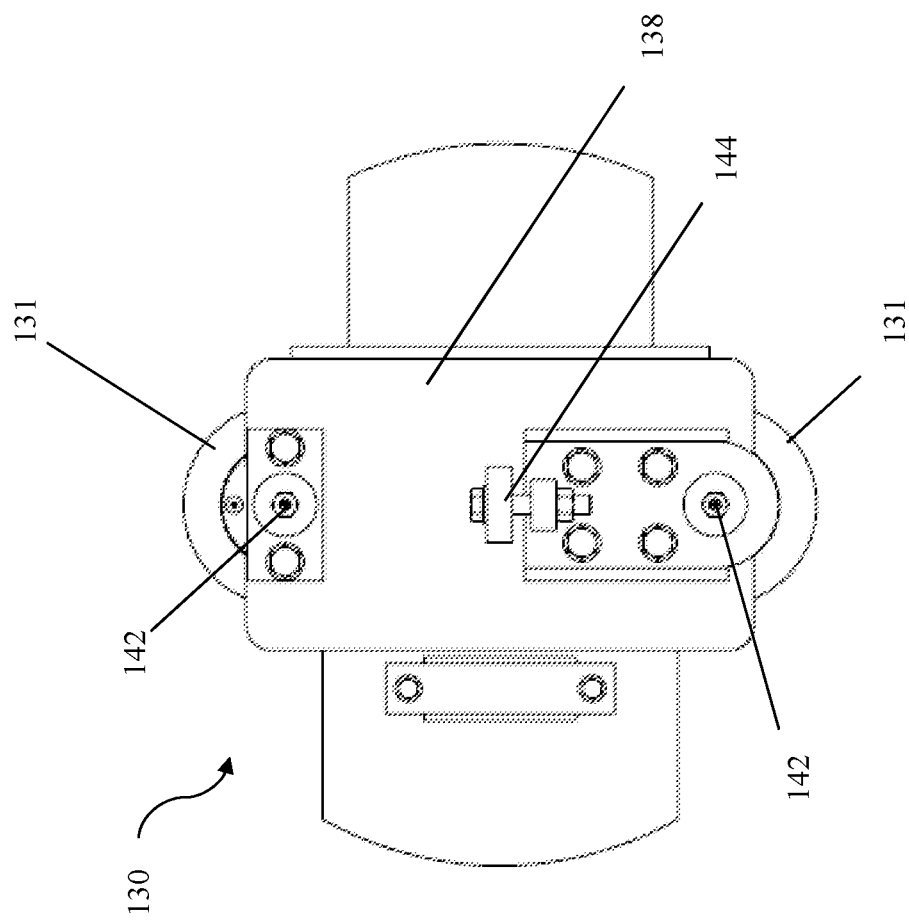
FIG. 11 shows a side view of a roller pair assembly, showing a fixed roller (top) and an adjustable roller (bottom).
Figure 13:
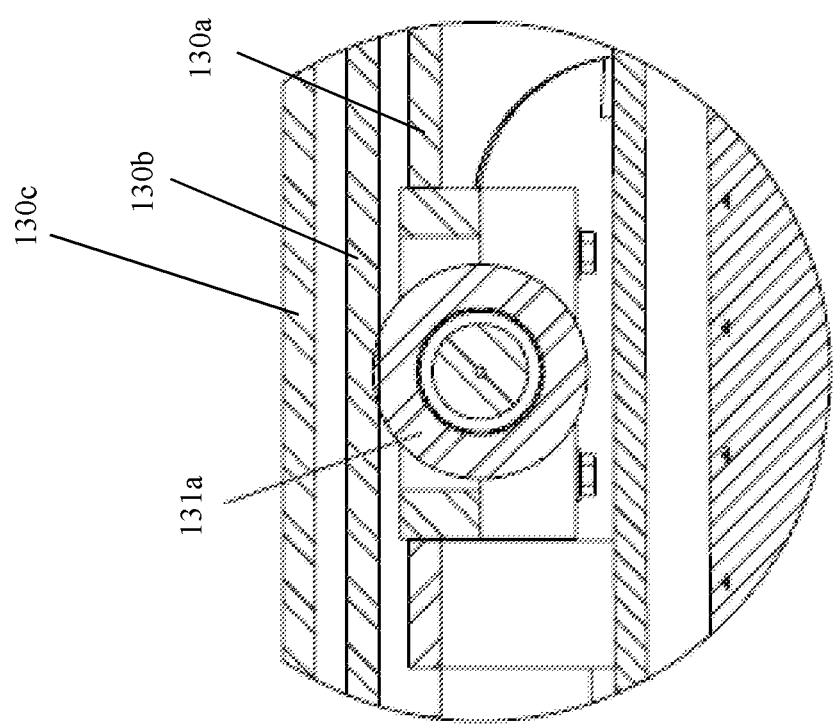
FIG. 13 shows an embodiment of the boom with an inner boom adjustable roller.

Referring to FIGS. 10 and 11, any of the rollers 131 disclosed herein can be fixed or adjustable. As noted above, the rollers 131 can be part of a roller pair assembly 130, wherein each roller 131 is supported by a bracket 138. The bracket 138 is configured to attach to the boom 114 and hold the rollers 131 at a desired position relative to the boom 114. The bracket 138 has apertures 142 configured to receive an axle 140 of a roller 131. The bracket apertures 142 can be shaped to receive and retain the axle 140 in a stationary manner—a fixed roller configuration. In the alternative, the bracket apertures 142 can have a channeled or slotted shape so as to allow for movement of the axle 140 (and thus the roller 130)—an adjustable roller configuration. The adjustable roller configuration includes a tensioner 144. When it is desired to adjust the relative position of the roller 131, the tensioner 144 is loosened and the roller 131 is moved by sliding the axle 140 along the channeled aperture 142. Movement of the roller 131 along the channeled aperture 142 is movement towards or away from the boom 114 (when the roller pair assembly 130 is attached to the boom 114). When the roller's 131 relative position is set, the tensioner 144 is tightened to hold the roller 131 in place. FIG. 13 shows an embodiment of the boom 114 with an inner boom adjustable roller 131a.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

What is claimed is:

1. A boom for a slag pusher apparatus, comprising:
a boom including a plurality of telescopingly engaged boom segments, the plurality of telescopingly engaged boom segments including an outer boom segment and an inner boom segment; and
a roller pair assembly having rollers positioned to act as an interface between the plurality of segments;
wherein the roller pair assembly is attached to the outer boom segment such that its rollers protrude through openings formed in the outer boom segment to make contact with the inner boom segment, and
wherein the roller pair assembly is attached to an outer surface of the outer boom segment such that its rollers protrude through the openings to make contact with an outer surface of the inner boom segment.

2. The boom of claim 1, wherein:
a roller of the roller pair assembly is a fixed roller or an adjustable roller.

3. The boom of claim 1, wherein:
the inner boom segment is configured to facilitate removable attachment of a consumable working end member.

4. The boom of claim 3, further comprising:
the consumable working end member.

5. The boom of claim 1, further comprising:
an actuator configured to control telescopic translation of the plurality of telescopingly engaged boom segments.

6. The boom of claim 5, wherein:
the actuator is located on a side surface of the boom.

7. The boom of claim 5, further comprising:
a control module to control actuation of the actuator.

8. The boom of claim 1, wherein:
the boom has a boom mounting end configured to mount the boom to a pivot assembly.

9. A boom for a slag pusher apparatus, comprising:
a boom including a plurality of telescopingly engaged boom segments, the plurality of telescopingly engaged boom segments including an outer boom segment, an intermediate boom segment, and an inner boom segment; and
a plurality of roller pair assemblies, each having rollers positioned to act as an interface between the plurality of boom segments, the plurality of roller pair assemblies including an inner roller pair assembly, an intermediate roller pair assembly, and an outer roller pair assembly, wherein:
the outer roller pair assembly is attached to the outer boom segment such that its rollers protrude through openings formed in the outer boom segment to make contact with the intermediate boom segment;
the intermediate roller pair assembly is attached to the intermediate boom segment such that its rollers protrude through openings formed in the intermediate boom segment to make contact with the inner boom segment; and
the inner roller pair assembly is attached to the inner boom segment such that its rollers make contact with the intermediate boom segment.

10. The boom of claim 9, wherein:
the outer roller pair assembly is attached to an outer surface of the outer boom segment such that its rollers protrude through the outer boom segment openings to make contact with an outer surface of the intermediate boom segment;
the intermediate roller pair assembly is attached to the outer surface of the intermediate boom segment such that its rollers protrude through the intermediate boom segment opening to make contact with an outer surface of the inner boom segment; and
the inner roller pair assembly is attached to the outer surface of inner boom segment such that its rollers make contact with an inner surface of the intermediate boom segment.

11. The boom of claim 9 wherein:
a roller of the plurality of roller pair assemblies is a fixed roller or an adjustable roller.

12. The boom of claim 9, wherein:
the inner boom segment is configured to facilitate removable attachment of a consumable working end member.

13. The boom of claim 12, further comprising:
the consumable working end member.

14. The boom of claim 9, further comprising:
an actuator configured to control telescopic translation of the plurality of telescopingly engaged boom segments.

15. The boom of claim 14, wherein:
the actuator is located on a side surface of the boom.

16. The boom of claim 14, further comprising:
a control module to control actuation of the actuator.

17. The boom of claim 9, wherein:
the boom has a boom mounting end configured to mount the boom to a pivot assembly.

18. A slag door pusher apparatus, comprising:
a base;
a pivot assembly connected to the base; and
a boom including a plurality of telescopingly engaged boom segments, the plurality of telescopingly engaged boom segments including an outer boom segment, an intermediate boom segment, and an inner boom segment; and
a plurality of roller pair assemblies, each having rollers positioned to act as an interface between the plurality of boom segments, the plurality of roller pair assemblies including an inner roller pair assembly, an intermediate roller pair assembly, and an outer roller pair assembly, wherein:
the outer roller pair assembly is attached to the outer boom segment such that its rollers protrude through openings formed in the outer boom segment to make contact with the intermediate boom segment;
the intermediate roller pair assembly is attached to the intermediate boom segment such that its rollers protrude through openings formed in the intermediate boom segment to make contact with the inner boom segment; and
the inner roller pair assembly is attached to the inner boom segment such that its rollers make contact with the intermediate boom segment.

19. The slag door pusher apparatus of claim 18, wherein:
the pivot assembly facilitates pivoting motion of the boom in a vertical direction relative to the base; and
the pivot assembly includes a turret to facilitate rotational motion of the boom in a horizontal direction relative to the base.

* * * * *